(12) United States Patent  (10) Patent No.: US 8,393,530 B1
Batten et al.  (45) Date of Patent:  Mar. 12, 2013

(54) RELATIVE RANKING AND DISCOVERY OF ITEMS BASED ON SUBJECTIVE ATTRIBUTES

(75) Inventors: Teresa E. Batten, Seattle, WA (US); Sean W. Blakey, Seattle, WA (US); Eric F. Gilmour, Issaquah, WA (US); David M. Lifson, Seattle, WA (US); Ian A. McAllister, Seattle, WA (US); Scott Allen Mongrain, Seattle, WA (US); Clayton A. Williams, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/978,161

(22) Filed: Dec. 23, 2010

Related U.S. Application Data

(62) Division of application No. 11/692,879, filed on Mar. 28, 2007, now Pat. No. 7,878,390.

(51) Int. Cl.
*G07C 13/00* (2006.01)
*G06F 17/00* (2006.01)
*G06Q 30/00* (2012.01)

(52) U.S. Cl. ........ 235/51; 235/375; 705/26.1; 705/26.7; 705/26.8; 705/27.1; 705/27.2

(58) Field of Classification Search .................... 235/51, 235/375; 705/14.49, 14.54, 14.55, 26.1–27.2; 715/700

See application file for complete search history.

(56) References Cited

U.S. PATENT DOCUMENTS

| | | | |
|---|---|---|---|
| 7,246,110 B1 | 7/2007 | Musgrove et al. | |
| 7,431,209 B2 * | 10/2008 | Chung | 235/386 |
| 7,664,669 B1 * | 2/2010 | Adams et al. | 705/7.32 |
| 2003/0014277 A1 * | 1/2003 | Kinney | 705/1 |
| 2005/0021796 A1 | 1/2005 | McClain et al. | |
| 2005/0238251 A1 * | 10/2005 | Lunetta et al. | 382/284 |
| 2006/0282304 A1 | 12/2006 | Bedard et al. | |
| 2007/0073591 A1 * | 3/2007 | Perry et al. | 705/26 |
| 2007/0192168 A1 | 8/2007 | Van Luchene | |
| 2007/0220096 A1 * | 9/2007 | Silver et al. | 709/206 |
| 2007/0282670 A1 * | 12/2007 | Repasi et al. | 705/10 |
| 2007/0294127 A1 | 12/2007 | Zivov | |
| 2008/0082479 A1 | 4/2008 | Chang et al. | |
| 2008/0126996 A1 * | 5/2008 | Morris et al. | 715/854 |

* cited by examiner

*Primary Examiner* — Michael G Lee
*Assistant Examiner* — Laura Gudorf
(74) *Attorney, Agent, or Firm* — Lee & Hayes, PLLC

(57) ABSTRACT

Relative ranking of items is performed based on a subjective attribute of the items. A user interface that displays the relative ranking of the items includes an axis that corresponds to the subject attribute. The user interface further includes a display section that displays representations of the items along the axis according to rankings relative to the subjective attribute. The display section is also to present one or more additional items in response to customer input.

19 Claims, 11 Drawing Sheets

RELATIVE RANKING AND DISCOVERY OF ITEMS BASED ON SUBJECTIVE ATTRIBUTES

CROSS REFERENCE TO RELATED APPLICATIONS

This patent application is a divisional application of co-pending, commonly-owned U.S. patent application Ser. No. 11/692,879, entitled "Relative Ranking and Discovery of Items Based on Subjective Attributes", and filed on Mar. 28, 2007, which application is incorporated herein in its entirety by reference.

BACKGROUND

People who are interested in goods or services are increasingly turning to online resources (e.g., Internet websites) to research these goods and services. As this interest in online research has increased, rating services have become available that enable customers or other users to rate goods or services. These rating services may be provided by websites, for example. Typically, these rating services provide customers with a rating scheme by which the customers may assign some number of stars, for example, to reflect their opinions of some particular goods or services. These rating schemes are generally absolute in nature, in that the customer ratings indicate an overall score. However, customers providing input under these rating schemes may not directly compare different goods/services to one another. Consequently, these ratings may not accurately reflect how one good or service compares to another good or service.

Additionally, these rating services may reflect objective, measurable factors or attributes of goods or services. In the context of goods, examples of such factors may include size, weight, the presence or absence of certain features, or other physical characteristics. However, these rating services may not capture or provide subjective factors that are not directly measurable. Typically, these subjective factors may vary from reviewer to reviewer, and may reflect the personal opinions of different reviewers.

SUMMARY

Methods, systems, user interfaces, and computer-readable media (collectively, "tools" and/or "techniques") are described herein for relatively ranking items based on subjective attributes of the items, and for discovering these relatively ranked items. A user interface that displays the relative ranking of the items includes an axis that corresponds to the subject attribute. The user interface further includes a display section that displays representations of the items along the axis according to rankings relative to the subjective attribute. The display section is also to present one or more additional items in response to customer input.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to tools and techniques related to relative ranking and discovery of items based on subjective attributes. The description of these tools and techniques begins with an overview of illustrative operating environments for relatively ranking the items, and thereafter arranging and discovering the items along an axis based on subjective attributes, presented with FIG. 1.

Figure 1:
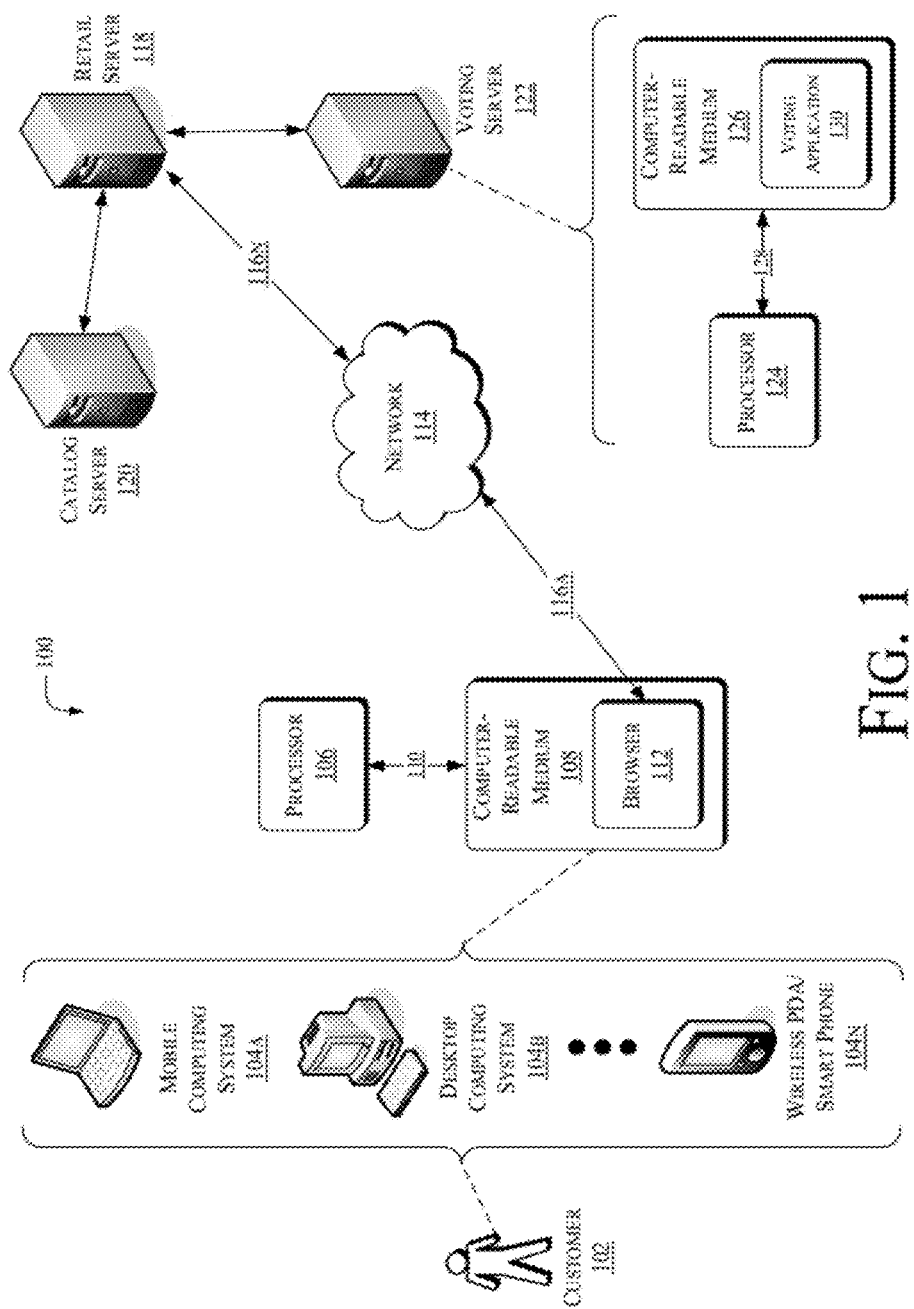
FIG. 1 is a block diagram depicting an illustrative operating environment including a voting server for determining a relative ranking of items based on subjective attributes and providing presentation information regarding said items based on such ranking to client devices.

FIG. 1 illustrates components and data flows relating to illustrative operating environments 100 for ranking items relatively based on subjective attributes. As shown in FIG. 1, one or more customers 102 may interact with client computing systems, denoted generally herein at 104. FIG. 1 provides several non-limiting examples of the client computing systems, including a mobile system 104a that represents portable notebook or laptop systems. A desktop system 104b represents stationary workstation systems, and a communications-enabled personal digital assistant (PDA) or smartphone 104n represents a handheld device with wireless communications capability.

The devices 104 may include one or more processors 106 that communicate with one or more instances of computer-readable storage media 108 over one or more bus systems 110. The processors 106 and bus systems 110 may be of any suitable configurations or architectures chosen as appropriate for particular implementations.

The computer-readable storage media 108 may include at least a client application 112, through which the customer 102 may interact with one or more network-accessible resources. The client application 112 may include a web browser, for example. Examples of these network-accessible resources may include Internet websites that are accessible over one or more networks 114. Additionally, FIG. 1 illustrates a client-server distributed environment only for ease of discussion, but not to limit possible implementations. For example, the description herein may be implemented in standalone environments.

FIG. 1 denotes the communications and data flows between the browser 112 and the network-accessible resources generally at 116. More specifically, flows between the browser and the network are denoted at 116a, and flows between the network and the network-accessible resources are denoted at 116n.

The network-accessible resources may be supported by one or more servers. In different implementations, the network-accessible resources may offer a variety of different services to the customers. For example, the network-accessible resources may provide search engine services, services related to polling or opinion research, ecommerce/retail services, or other types of services. The non-limiting example shown in FIG. 1 includes a retail server 118, a catalog server 120, and a voting server 122. The retail server 118 may primarily handle the interactions with the customers 102, and may query the catalog server 120 as appropriate to provide the customers with information related to goods and/or services (collectively and interchangeably referred to as "items") that are available through the network-accessible resources. The voting server 122 may enable the customer to participate in indicating a preference for particular items as compared to other items. Afterwards, the tools and techniques described herein aggregate these preferences to rank the compared items.

Turning in more detail to the voting server 122, it may include one or more processors 124, which may or may not be the same type and architecture as the processor 106. The voting server 122 may include one or more instances of a computer-readable storage medium 126 that communicates with the processor 124 over one or more bus systems 128. The processors 124 and bus systems 128 may be of any suitable configurations or architectures chosen as appropriate for particular implementations.

Turning to the computer-readable storage medium 126 in more detail, it may include at least a voting application 130. The voting application 130 may include one or more modules of software instructions that, when loaded into the processor 124 and executed, cause the voting server 122 to perform various functions in connection with ranking items relatively based on subjective attributes.

It is noted that the servers 118, 120, and 122 may be each associated with one network-accessible resource (e.g., a website), or the network-accessible resource may be distributed across multiple servers. For example, the voting server 122 and related functionality may be hosted by a third party, who may offer hosting services to another website that operates the servers 120 and 118.

Figure 2:
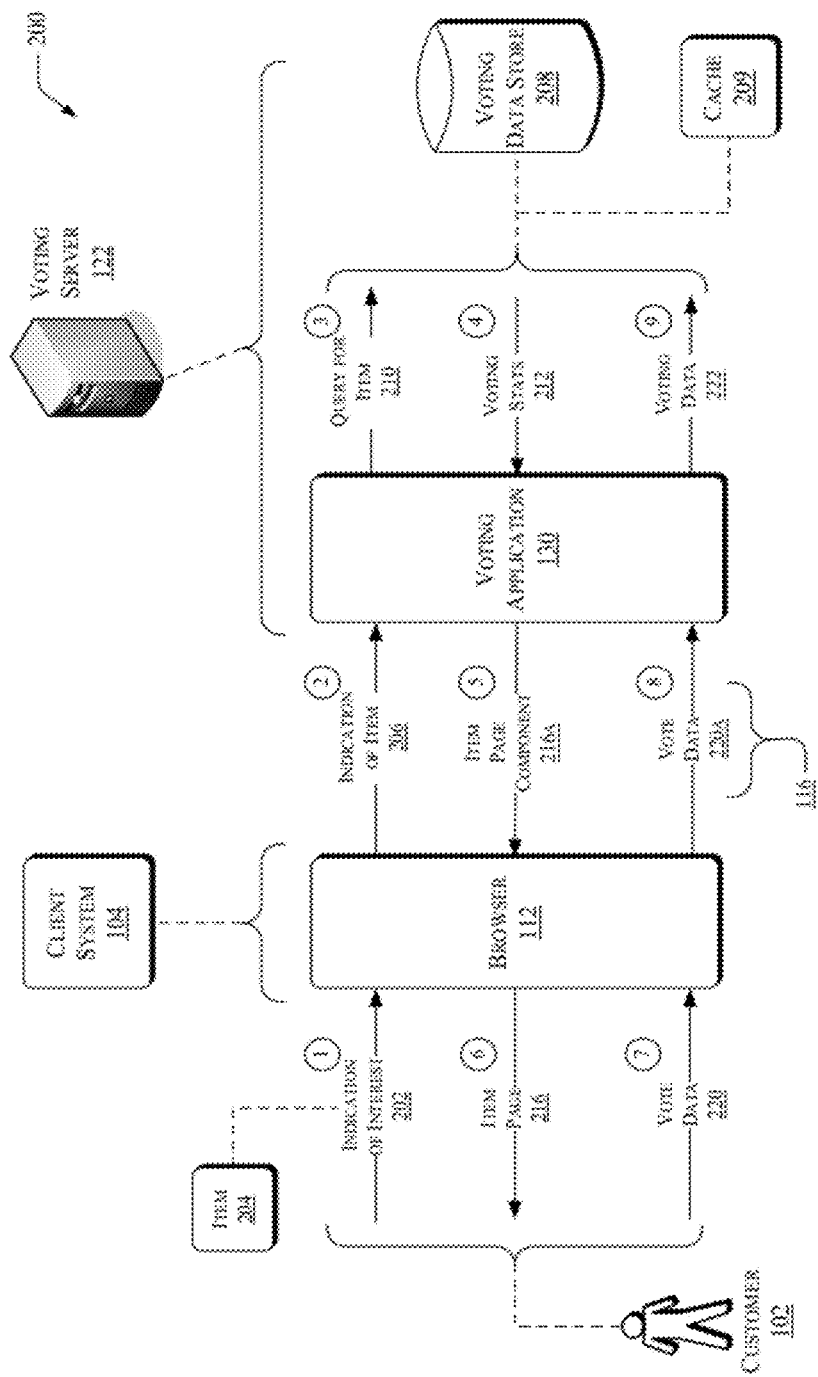
FIG. 2 is a block diagram depicting illustrative operations of components of the voting server and a client device for presenting items to the customer related to ranking based on subjective attributes, and for providing the presentation information to a customer.

Having described an illustrative operating environment 100 for ranking the items relative to one another based on subjective attributes and for providing this ranking information to client devices, the discussion now proceeds to a more detailed description of components and data flows related to the voting server and the client device, now presented in FIG. 2.

FIG. 2 illustrates operations of components of the voting server and a client device for presenting items to the customer related to ranking based on subjective attributes, and for providing the presentation information to a customer. For convenience but not limitation, some elements described previously are carried forward into FIG. 2 and denoted by the same reference numerals.

FIG. 2 represents examples of various data flows with directional arrows, and denotes these arrows with reference numerals. For additional clarity of discussion, but not to limit possible implementations, FIG. 2 indicates an illustrative sequence of data flows by additionally numbering the arrows with digits that appear within circles.

Figure 5:
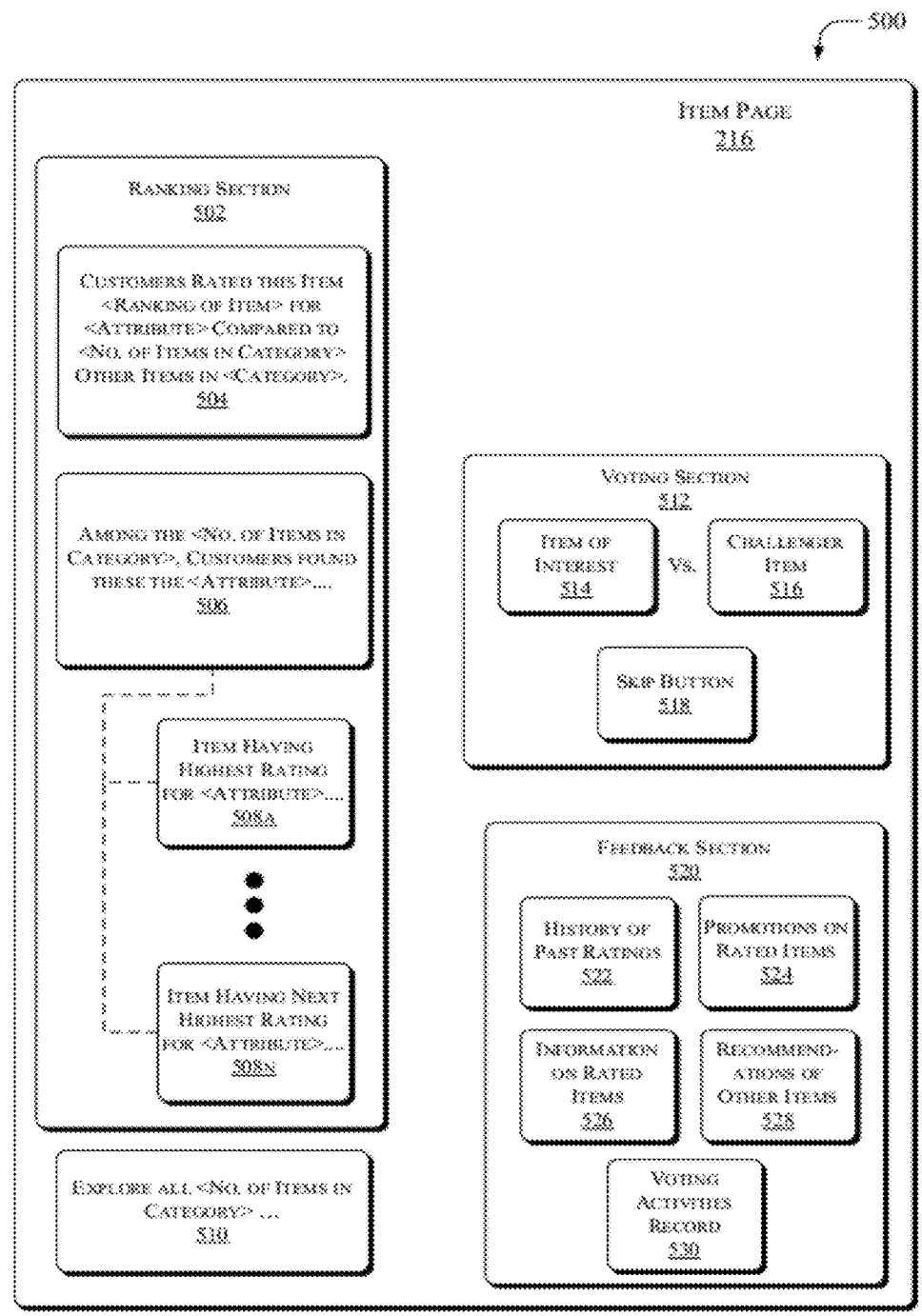
FIG. 5 is a block diagram depicting an illustrative item page used to determine the relative rankings.

Turning to FIG. 2, the browser 112 may receive an initial indication from a customer 102 of interest in some particular item. For example, a customer may be researching the item by searching for online reviews or rankings of the item, and may be attempting to locate such reviews or rankings by entering one or more appropriate keywords into a search engine or e-commerce website. In response to these keywords, the tools and techniques described herein may be used to generate an item page that presents information related to the item of interest. FIG. 5 provides more detail relating to an exemplary webpage, but in overview, this webpage may include at least a ranking section, a voting section, and a feedback section.

The ranking section may indicate how other customers have ranked the item of interest relative to other similar items, for one or more subjective attributes of interest. The information presented in the ranking section may be compiled by aggregating votes cast by a plurality of customers over time to indicate or express preferences for one item over another as better exemplifying the subjective attribute. In the context of DVD movies, an example of the subjective attribute may include perceived funniness or humor.

Additionally, the ranking section may include a display or representation of a plurality of the items, arranged in order along an axis corresponding to the subjective attribute. The ranking section may enable the customer to discover how other customers have ranked the items for the subjective attribute, by enabling the customer to navigate along the axis to browse through these items.

The voting section may enable a given customer to vote between the item of interest and at least one other similar item as better exemplifying the subjective attribute. In this manner, the voting section may enable the customer to express preferences for either the item of interest or the other item (referred to as a "challenger" herein) regarding the subjective attribute. For example, if the customer has viewed a given DVD, and now wishes to purchase or rent it for later viewing, the customer may be able to vote on how funny that given DVD is, compared to one or more other DVDs. These votes may then be reflected in the rankings that are presented afterwards.

The feedback section may enable the customer to review any votes that he or she has cast previously. In addition, the feedback section may present the customer with recommendations, sales information, promotional information, or other suitable information related to ranked items.

FIG. 2 denotes the indication of interest in the particular item generally at 202. For example, the browser 112 may receive the indication 202 in the form of a search string provided by the customer that contains one or more keywords. In other examples, the browser 112 may receive the indication 202 in the form of signals representing one or more clicks or other manual input directed to a webpage presented by the browser, where the webpage features representations of one or more items.

The indication 202 may include data or information representing the item of interest to the customer, with FIG. 2 denoting the item of interest at 204. Examples of the items may include, but are not limited to, books, tools, apparel, hardware, electronics, services, media (e.g., DVDs, VHS tapes, MP3 or other media downloads, or the like).

The browser may then convey the indication of the item as part of the data flows 116. In turn, the browser may transmit the indication of the item directly or indirectly to the voting application 130. FIG. 2 denotes the indication of the item as transmitted from the browser to the voting application at 206. The indications 206 may be implemented using HTML, XML, or other suitable language, for example.

The voting server may include a voting data store 208 that stores voting data indicating votes cast by customers. As voting data arrives, the voting server may write the voting data to the voting data store 208. The voting server may also include one or more caches 209, which may contain a subset of voting data as stored in the voting data store, aggregated as appropriate. The aggregated voting data may be read from the caches 209 on demand.

Having received the indication 206, the voting application 130 may query, for example, the cache with this indication to determine whether any voting statistics exist for the item 204 contained in the indication. More specifically, these voting statistics may indicate whether any other customers have compared the item of interest to one or more challenger items, with respect to one or more subjective attributes relevant to the items. FIG. 2 denotes this query at 210. If voting statistics already exist for the particular item 204, the cache may return the voting statistics for the particular item 204, denoted generally at 212.

In response to receiving the voting statistics 212, the voting application may formulate an item page component 216a that is incorporated into an item page, denoted at 216, that provides these voting statistics in a format suitable for presentation to the customer. The item page 216 and related components 216a are described and illustrated more particularly below, but in overview, the item page component 216a and underlying voting statistics indicate how customers have previously ranked the item 204 relative to other items in similar categories. Because these items are ranked relative to one another, the items are described herein as being "relatively ranked." The item page component 216a may also include representations of various items ("challengers") to be compared against the item of interest. In the relative ranking schemes described herein, a given customer may be asked to compare item A side-by-side with item B, and expressly state an opinion as to how item A compares with item B. The relative ranking schemes described herein are distinguished from previous techniques, in which a scale (e.g., a "star" scale ranging from one to five stars) is defined for ranking items using a more absolute scale applied consistently across a group of products. In these previous techniques, a customer may assign item A with three "stars", and another customer may assign item B with four "stars", but these customers have not actually compared item A with item B.

In addition to relatively ranking the items as described above, the tools herein also provide techniques for ranking these items according to one or more attributes applicable or relevant to the items. Typically, these attributes are subjective in nature and represent opinions obtained from customers regarding the items, and do not relate to other objectively measurable characteristics of the items. For example, assuming that the item is a particular DVD title of a comedy movie, the relevant attribute might be how funny the DVD movie is, in the opinions of customers. In another example, assuming that the item is a particular shoe, the relevant attributes might include how stylish the shoe is, or how comfortable the shoe is.

Because the ranking schemes described herein measure attributes of items that are subjective in nature, rather than objective, these ranking schemes may be characterized as measuring subjective attributes. Further, these schemes may rank these items according to these measured subjective attributes.

The voting application may then provide the item page 216 to the customer's browser 112. The item page 216 may be implemented in, for example, HTML, XML, or other suitable language.

If voting statistics do not exist for the particular item 204, then the voting application may not create the item page component 216a, but may instead update a cache to indicate that a customer has expressed interest in the item 204. The operation of this cache is described in more detail below with respect to FIG. 4.

At the browser 112, FIG. 2 denotes an item page as presented to the customer at 216. The item page 216 may include visible renditions of the code implementing at least the item page component 216a.

The browser 112 may receive voting data 220 that is provided by the customer. The voting data 220 may include comparisons or opinions provided by the customer in response to the item page 216. As detailed further in examples below, the item page 216 may prompt the customer to render an opinion as to how one or more subjective attributes of the item 204 compares to similar attributes of one or more other similar items. For example, if the item at hand is a given title of a comedy DVD, the item page 216 may ask the customer whether the given title is funnier than one or more other comedy DVDs.

The voting data 220 may represent customer input, as provided in any suitable form to the browser 112. For example, the browser 112 may receive indications of mouse clicks on particular portions of a graphical user interface (UI). In turn, the browser 112 may transmit the voting data 220 in, for example, HTML, XML, or other suitable language. FIG. 2 denotes at 220a the voting data as transmitted by the browser to the voting application 130.

The customer 102 may provide the voting data in the context of one particular item of interest, in which cases the customer compares some characteristic of the item of interest to one or more challenger items. The particular item of interest remains a constant to which the other items are compared, with the item of interest being compared to the challenger items one at a time. In other instances, the customer may compare items in a particular category or sub-category, without having manifested interest in any given item. In these latter cases, the customer may traverse some or all of the items in the given category or sub-category, and vote on the items with respect to some trait or characteristic, with no particular item being held constant through the various comparisons.

The voting application 130 may receive the voting data 220a and convert it as appropriate for storage in the voting data store 208. In this manner, the voting application may update the voting data store over time as more customers have the opportunity to opine on various items. FIG. 2 denotes these updates to the voting data store as voting data 222.

Figure 3:
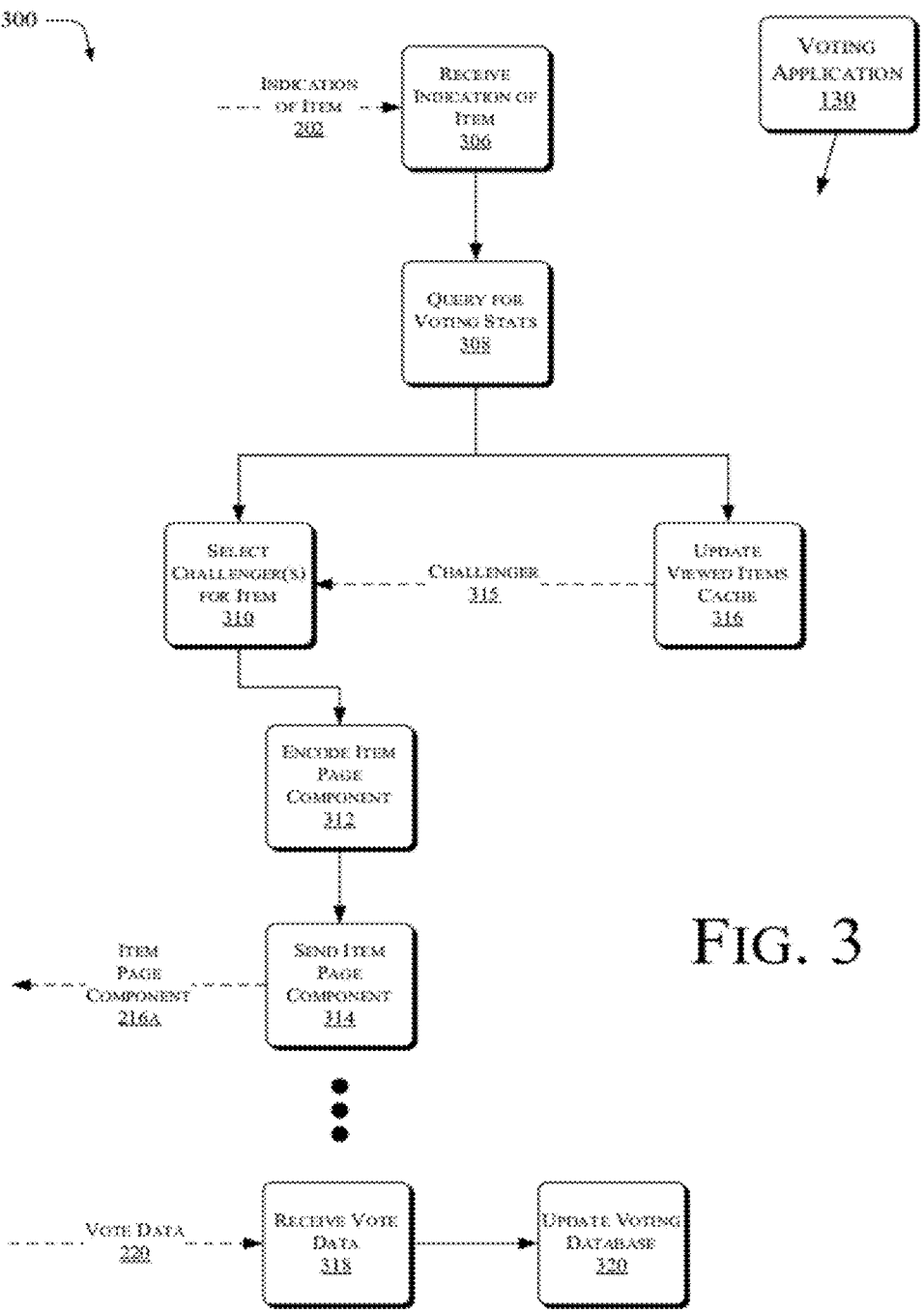
FIG. 3 is a flow diagram depicting an illustrative process for ranking items relatively based on subjective attributes used for voting data received from the client devices.

Having described the data flows 200 related to ranking items relatively based on subjective attributes in FIG. 2, the discussion now turns to a description of process flows related to ranking items relatively based on subjective attributes, now presented with FIG. 3.

FIG. 3 illustrates process flows 300 related to ranking items relatively based on subjective attributes. For convenience but not limitation, some elements described previously are carried forward into FIG. 3, and are denoted by the same reference numerals. Additionally, for ease of description, some portions of these process flows 300 are shown as being performed by the browser and the voting application described above. However, it is noted that other components may perform at least part of these process flows 300 without departing from the scope and spirit of the description herein. In FIG. 3, process flows are represented by solid lines, and data flows are represented by dashed lines.

At the voting application, block 306 represents receiving the indication of the item of interest to the customer. Afterwards, block 308 represents querying for any voting statistics related to the item of interest. These voting statistics may indicate how customers as a whole have ranked the item of interest relative to other similar items, with these rankings being based on one or more subjective attributes of the items. FIG. 2 provides examples of a query at 210, and provides examples of the voting statistics at 212. Block 308 may include querying a voting data store (e.g., 208).

Block 310 represents selecting one or more challenger items to be compared against the item of interest. As described in further detail below, the customer may be prompted to compare the item of interest to at least one of the challenger items with respect to at least one subjective attribute. These comparisons may occur one at a time, between the item of interest and one of the challenger items. Block 310 may employ any number of strategies to select the challengers. For example, the challengers may be selected randomly from among a list of items that are comparable or similar to the item of interest. As another non-limiting example, block 310 may include selecting one or more challenger items from a pre-determined list of challenger items.

Block 312 represents encoding an item page component that incorporates any voting statistics located for the particular item of interest. These voting statistics may include indications of votes on the item that were previously cast by other customers. The voting statistics may also include indications of other items that may be "challengers" to the item of interest, such that the customer is prompted to compare the item of interest to one or more of these challengers, and vote on which item better exemplifies a subjective characteristic. Afterwards, block 314 represents sending the item page from the voting application. Block 314 may include sending the item page to the browser. FIG. 3 carries forward the example of the item page component at 216a.

Block 316 represents updating a viewed items cache to indicate that the customer has expressed interest in and/or viewed a particular item. In this manner, once enough customers have viewed the particular item, the item may appear as a challenger matched one at a time against other items. A particular item may appear as a challenger after being viewed by any convenient number of customers, with this number being one or more. Block 316 may be part of a process by which new or lesser-known items are eventually exposed or surfaced to customers for voting. Referring briefly back to block 310, the challengers may be selected, at least in part, from items that were entered in the cache previously at block 316. FIG. 3 denotes the selection of challengers from the cache by the dashed line 315. Additionally, the strategies for selecting the challengers may include any of the techniques described above with respect to block 310, combined with selecting items from the cache. As shown in FIG. 3, block 316 may occur in parallel with blocks 312 and 314.

After the voting application sends the item page component 216a, the voting application may receive vote data in response to the item page. FIG. 3 carries forward an example of the vote data at 220. At the voting application, block 318 represents receiving the vote data from, for example, a browser. Block 320 represents updating a voting data store (e.g., 208) to incorporate the latest voting input received from the customer.

If block 308 does not locate any voting statistics for the item of interest, then there may be no statistical basis for performing blocks 310-314 and 318-320, and these blocks may be omitted. However, block 316 may be performed whether or not block 308 provides voting statistics for the item of interest.

Figure 4:
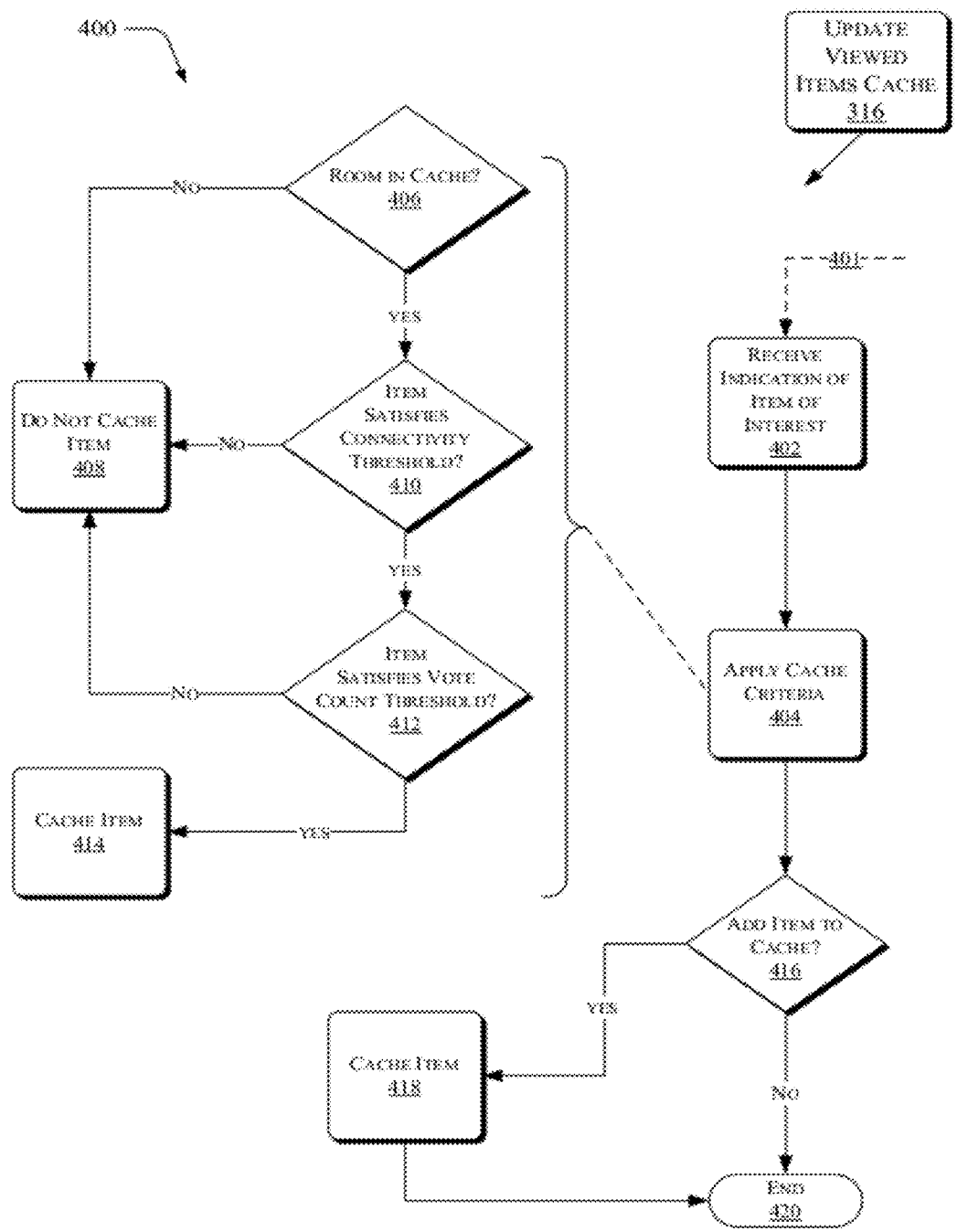
FIG. 4 is a flow diagram depicting an illustrative process for updating a cache used to store items that the customers have previously viewed and that may be used subsequently to generate voting data.

Having described the process flows 300 related to ranking items relatively based on subjective attributes in FIG. 3, the discussion now turns to a more detailed description of process flows for updating the viewed items cache, now presented with respect to FIG. 4.

FIG. 4 illustrates process flows 400 for updating a viewed items cache used to store items that customers have previously viewed, and that may be used subsequently to select "challenger items." For convenience but not limitation, some elements described previously may be carried forward into FIG. 4, and are denoted by the same reference numerals. For example, the process flows elaborate further on block 316 in FIG. 3.

For convenience but not limitation, FIG. 4 illustrates the process flows 400 as an event-driven process, initiated in response to a customer indicating interest in a particular item. FIG. 4 denotes a call to invoke the process flows 400 generally by the dashed line 401.

When a customer (e.g., 102) visits a given web page on which an item of interest is featured, the process flows 400 may determine whether the item of interest is to be entered into the viewed item cache. Items placed in the viewed items cache may later be extracted from the cache to serve as challenger items to other items of interest.

Turning to the process flows 400 in more detail, block 402 represents receiving an indication of an item of interest. Block 402 may include receiving notification that a customer is currently browsing a web page featuring the item of interest.

Block 404 represents applying one or more criteria to determine whether the item of interest should be cached. FIG. 4 expands further on block 404 as shown, illustrating three example criteria that may be considered conjunctively in any suitable order. The order of consideration shown and discussed in FIG. 4 is illustrative only.

Turning to the caching criteria in more detail, block 406 represents determining whether room exists in the cache for the current item of interest. The viewed items cached may have a given fixed length, such that only the most recently viewed and/or most popular items are inserted into the cache. If no room remains in the cache, the process flows 400 may take the No branch from block 406 to block 408, which represents a determination not to cache the current item of interest. On the other hand, if room is available in the cache, the process flows 400 may take the Yes branch from block 406 to evaluation block 410.

Block 410 represents determining whether the current item of interest satisfies a connectivity threshold. Connectivity as used herein refers to how many other unique items have already been compared to the current item of interest. The lower the connectivity for a given item, the fewer the number of other items have been compared to the given item. The caching criteria may be biased in favor of caching items that have been compared to few other items, in the interests of building a richer set of comparisons across items. Thus, block 410 may include evaluating whether the connectivity of the current item of interest falls below some minimum threshold. The lower the connectivity of the current item of interest, the more likely it is to be cached, and ultimately compared to other similar challenger items.

If the current item of interest is higher than the minimum connectivity threshold, then the process flows 400 may take the No branch from block 410 to block 408, which represents a determination not to cache the current item of interest. Otherwise, if the current item of interest is at or lower than the minimum connectivity threshold, then the process flows 400 may take the Yes branch from block 410 to evaluation block 412.

Block 412 represents determining whether the current item of interest satisfies a vote count threshold. Vote count as used herein refers to how many times the item of interest has been compared to other items by unique customers. The lower the vote count is for a given item, the fewer the number of unique customers who compared the given item to other items. The caching criteria may be biased in favor of caching items that have been compared to few other items, in the interests of building a richer set of comparisons across items. Thus, block 410 may include evaluating whether the vote count of the current item of interest falls below some minimum threshold. The lower the vote count of the current item of interest, the more likely it is to be cached, and ultimately compared to other similar challenger items.

In some implementations, block 412 may include caching items having a relatively higher vote count. In these implementations, the caching criteria may be biased in favor of caching items that are of higher interest to customers.

If the current item of interest is higher than the minimum vote count threshold, then the process flows 400 may take the No branch from block 412 to block 408, which represents a determination not to cache the current item of interest. Otherwise, if the current item of interest is at or lower than the minimum vote count threshold, then the process flows 400 may take the Yes branch from block 412 to block 412, which represents a determination to cache the item of interest.

Evaluation block 416 represents evaluating whether the current item of interest meets the caching criteria, as indicated by either block 408 (do not cache) or block 414 (cache). If the caching determination is positive, the process flows 400 may take the Yes branch from block 416 to block 418, which represents caching the item. Afterwards, the process flows may proceed to an end state 420. When the next item of interest arrives, the process flows 400 may be re-invoked, as denoted at 401, to determine whether to cache this next item of interest.

Returning to evaluation block 416, if the caching determination is negative, the process flows 400 may take the No branch from block 416 directly to the end state 420, thereby not caching the current item of interest.

Items from the viewed items cache may be selected for presentation to the customers as "challenger" items. When a given item has been selected as a challenger item, it may be removed from the cache to provide room to insert other items. The viewed items cache may be implemented to remove the given item after it has been selected as a challenger once, or after the given item has been selected multiple times. Additionally, the viewed items cache may remove items that have not been selected as challengers for some period of time. In this manner, the cache may remove "stale" items. These removal techniques may execute when the cache becomes full, or may execute at all times regardless of whether the cache is full.

Having described the process flows 400 for updating a viewed items cache in FIG. 4, the discussion now turns to a description of example item pages, now presented with FIG. 5.

FIG. 5 illustrates features 500 of example item pages. For convenience but not limitation, some elements described previously are carried forward into FIG. 5 and denoted by the same reference numerals.

For convenience of description, FIG. 5 includes examples of verbiage used to label various areas within the item page. Additionally, FIG. 5 provides examples of possible layouts of these areas. However, the labels and layouts shown in FIG. 5 do not limit possible implementations. More specifically, it is noted that implementations of the item page may include any suitable labels, and these labels may differ from those shown in FIG. 5. Also, implementations of the item page may use different layouts than those shown in the examples of FIG. 5. These same comments apply equally to the elements presented in the rest of the Figures herein, for example FIGS. 10 and 11.

FIG. 5 carries forward the item page as denoted at 216. The item page may express how a given item (e.g., 204) of interest to a customer ranks relative to other similar items for one or more subjective attributes, in the opinions of other customers.

The item page may include a ranking display section 502, which may present ranking information relating to the given item of interest. For example, as indicated in an area 504, the item page may present a message indicating how customers have ranked the given item of interest for one or more of the subjective attributes. The items may be organized into categories with other similar items. The area 504 may indicate how many items are in the same category as the item of interest, and may indicate the attribute for which the items were judged by the customers. Within a given category, items may be ranked for one or more different attributes, and may be ranked differently for these attributes. For example, assuming a category pertaining to shoes, a given shoe may be ranked for comfort as one attribute, and for style as another attribute. This given shoe may be ranked highly for style, but lower for comfort, and vice versa.

On an ongoing basis, the tools described herein may maintain listings of the top items in each category, as ranked for some subjective attribute. The item page may include an area 506 that lists the top N items ranked in the category in which the given item of interest lies, with N chosen as any suitable integer, considering how much space is available in the item page. FIG. 5 includes two examples of listings of such items at 508a and 508n.

The item page may include a link or other device by which the customer may navigate to a listing of all items to which the given item of interest has been compared. FIG. 5 denotes this link or other device at 510.

The item page may include a voting section 512, which may provide buttons or other graphic user interface devices by which the customer may vote to compare the given item of interest with another item in a same category, for example. FIG. 5 shows a button 514 for the item of interest to the customer, and a button 516 for another item in the category, referred to as a "challenger" item. In this manner, the item page provides for side-by-side rankings of items to one another. As the customer votes on various items, the item of interest corresponding to the button 514 may remain constant, while the challenger items corresponding to the button 516 may change as voting proceeds. In other implementations, where the customer is traversing a category or sub-category of items, and has not manifested interest in a particular item, the items for both buttons 514 and 516 may change as voting proceeds.

The voting section 512 may also include a skip button 518, which is responsive to customer input to select a next challenger item for comparison to the item of interest. The voting section may update the challenger item button 516 in response to the customer clicking or otherwise interacting with the skip button 518. For example, the customer may click the skip button 518 if he or she does not wish to express an opinion or preference between the items represented in the buttons 514 and 516, or wishes to decline expressing such opinions or preferences.

In a more specific example, the voting section 512 may prompt the customer to vote which of the two items better exhibit some subjective attribute. For example, if the category is comedy movies, the voting section 512 may present graphic representations of two movie titles, and prompt the customer to vote on which movie is funnier.

The item page 216 may also include a feedback section 520 that contains fields for presenting feedback information to the customer when the customer votes or rates items. For example, the feedback section 520 may include a history field 522 that indicates to the customer how he or she has rated certain items in the past. The history field may contain text such as "You have rated <itemA> as <attribute> than <itemB>," where "itemA" and "itemB" represent items on which the customer has voted previously, and where "attribute" represents some subjective attribute relevant to the items (e.g., perceived funniness).

A sales notification field 524 may provide information related to promotions, sales, or specials applicable to items on which the customer has voted. An information field 526 may provide any relevant information related to particular items on which the customer has voted, whether these items are items of interest or challenger items.

A recommendations field 528 may provide recommendations of additional items to the customers. These recommendations may be personalized for the customers based on items of interest reviewed by the customers, challenger items voted on by the customers, and/or depending on how the customers have voted on particularly compared items.

A voting record field 530 may indicate to a given customer how his or her voting activities compare to a community of other customers. For example, if the community is defined as those customers who have voted on items in a comedy DVD category, the voting record field 530 may indicate how the given customer's voting activity fits within that category, relative to other customers who have voted on comedy DVDs. Additionally, the voting record field 530 may indicate a percentage of other customers who voted similarly to the given customer regarding a given comparison of items.

Figure 6:
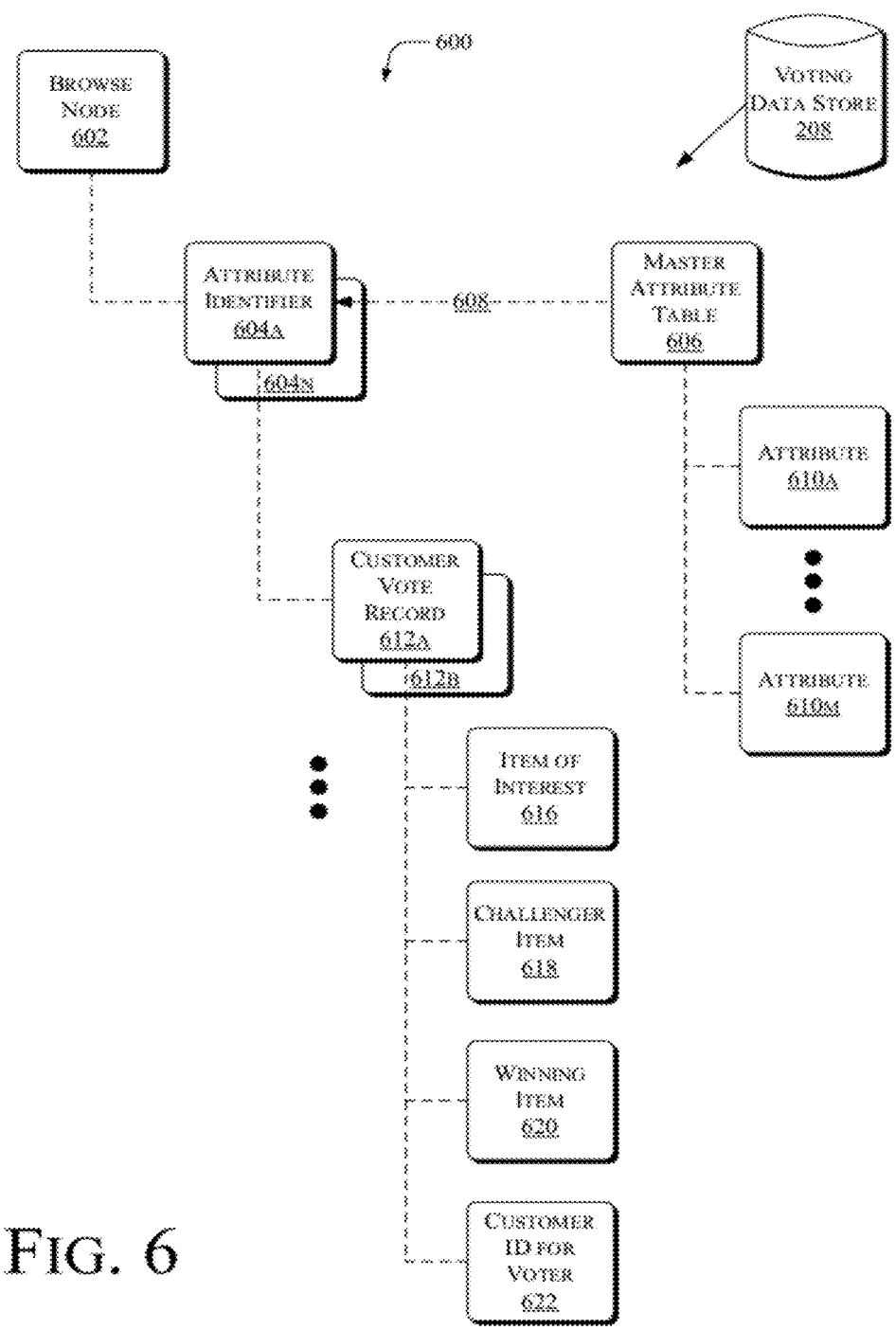
FIG. 6 is a block diagram illustrating data structures for a voting data store used to store the voting data as received from the customers.

Having described the features 500 of the example item page in FIG. 5, the discussion now turns to a description of example data structures for the voting data store, now presented with FIG. 6.

FIG. 6 illustrates data structures, denoted generally at 600, suitable for implementing the voting data store used to store the voting data as received from the customers. For convenience but not limitation, some elements described previously are carried forward into FIG. 6 and denoted by the same reference numerals.

FIG. 6 carries forward the voting data store 208 for ease or reference. The voting data store may be organized by any number of different categories. Non-limiting examples of categories are tags, collections, or other descriptors applied by customers. Examples of categories may also include browse nodes, with FIG. 6 showing an example record for a browse node at 602. These browse nodes may be chosen for convenience in organization. For example, assuming that the tools and techniques described herein are implemented in the context of an Internet website, the website may be modeled on a tree structure. In this tree structure, the homepage of the website may be the root node of the tree, and any pages accessible from the homepage may be sub-nodes under the root node. Different possible navigable paths through the website may be represented in the tree, and different points along these paths may be represented in the tree as browse nodes 602. Depending on the hierarchy by which the website is organized, these browse nodes may correspond to product categories, sub-categories, items provided by particular merchants or suppliers, items grouped by any convenient criteria, and/or items listed individually.

For a given browse node, denoted at 602, the voting data store may include any number of records for particular attributes relevant to that browse node. FIG. 6 provides two examples of attribute identifiers at 604a and 604n (collectively, attribute identifiers 604), but the voting data store could contain any number of attribute identifiers. For example, assuming that the browse node pertains to footwear, the attribute identifiers could correspond to different characteristics of the footwear (e.g., comfort, style, value, etc.).

The attribute identifiers 604 may be drawn from a master attribute table 606, as represented by the dashed arrow 608. The master attribute table 606 may contain entries for all the attributes of relevance to all of the browse nodes stored in the voting data store 208. FIG. 6 provides two examples of the attribute entries at 610a and 610m (collectively, attribute entries 610), but the master attribute table 606 may contain any suitable number of entries for different attributes. Examples of attributes may include comfort, style, and the like, depending on the nature of the items 204.

Associated with a given attribute identifier, the voting data store may include any number of records for particular instances in which customers have voted on which items better exemplify the attribute. FIG. 6 provides two examples of customer vote records at 612a and 612b, but the voting data store could contain any number of customer vote records, depending on how many customers have voted on items at any given time. Additionally, a given customer may have voted multiple different times, with a separate customer vote record being associated with each instance of voting, as indicated at 612b.

The respective instances of the customer vote records 612 may be associated with various sub-fields, with FIG. 6 showing examples of these sub-fields. For example, a customer identifier (ID) field may store data that uniquely identifies the customer who provided the votes captured in the customer vote records 612. A field 616 may store data indicating the item in which the customer may have manifested interest when casting the vote. A field 618 may contain data indicating a challenger item to which the voter compared the item of interest when casting a vote. A field 620 may indicate which item "won" the comparison. Put differently, the field 620 may indicate which item the voter considered to better exemplify the subjective attribute corresponding to the attribute identifier 604. Finally, a field 622 may indicate a customer identifier ("ID") for the customer, so that the voting data store may track particular votes cast by particular customers.

For example, returning to the comedy DVD example above, an attribute identifier 604 might be assigned to track votes for how funny particular DVDs are, as voted on by customers. In another example, the browse node may pertain to footwear, with the attribute identifiers pertaining to different characteristics relevant to shoes. In this example, the voting data store may define attribute identifiers for tracking votes indicating how comfortable the shoes are, or how stylish the shoes are.

The above fields and records of the voting data store may store the raw voting data used to populate the item records that are presented to customers. The voting application may aggregate the raw voting data stored in the voting data store to compute where a given item of interest has been ranked relative to other items within a category, in terms of the subjective attribute with which the ranking field is associated. For example, returning to the footwear example above, assume that attribute identifiers are defined to track the comfort and style of the footwear. In this example, the item page might indicate how comfortable the footwear was voted, as compared to other footwear. The item page might indicate how stylish the footwear was voted, as compared to other footwear.

Figure 7:
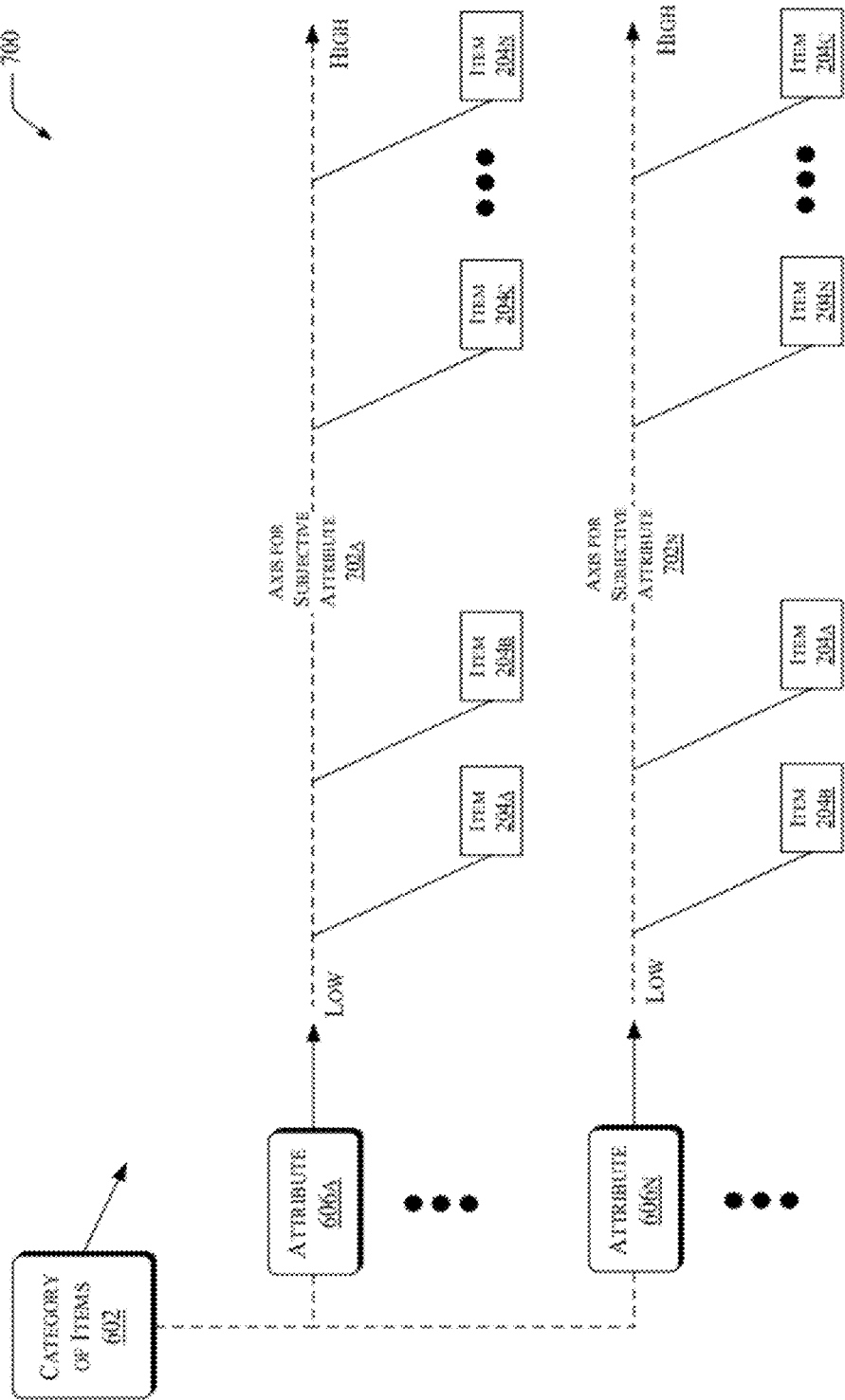
FIG. 7 is a block diagram illustrating rankings of items within a category, according to one or more subjective attributes, with the rankings being compiled based on the voting data as received from the customers.

Having described the data structures 600 for the voting data store in FIG. 6, the discussion now turns to a description of how different items may be ranked differently according to different subjective attributes, now presented with FIG. 7.

FIG. 7 illustrates rankings, denoted generally at 700, of items within a category, according to one or more subjective attributes, with the rankings being compiled based on the voting data as received from the customers. For convenience but not limitation, some elements described previously are carried forward into FIG. 7 and denoted by the same reference numerals.

FIG. 7 carries forward the category record 602. For example, the category record may pertain to footwear, recalling the example from above. FIG. 7 also carries forward the attribute records 606*a* and 606*n*. Recalling the footwear example, the attribute records may pertain, respectively, to the comfort and the style of different types of the footwear, as ranked by customers.

As shown in FIG. 7, an axis 702*a* corresponds to the attribute 606*a*, and illustrates how various items may be ranked from low to high along this axis, depending on how customers may rank the items for the attribute 606*a*. Similarly, an axis 702*n* corresponds to the attribute 606*n*, and illustrates how various items may be ranked from low to high along this axis, depending on how customers may rank the items for the attribute 606*n*.

FIG. 7 provides four examples of items of possible interest to customers, referenced at 204*a*, 204*b*, 204*c*, and 204*n* (collectively, items 204). In the footwear example, the different items 204*a*-204*n* may be different brands or models of shoes. Turning to the axis 702*a*, in the footwear example, this axis may correspond to a "comfort" attribute associated with shoes in the footwear category. In the example shown, the item 204*a* is ranked lowest for comfort, with the items 204*b*, 204*c*, and 204*n* being more comfortable, respectively. Thus, in this example, the axis 702*a* indicates how the items 204 are ranked for the subjective attribute "comfort," from lowest to highest.

Turning to the axis 702*n*, in the footwear example, this axis may correspond to a "style" attribute associated with shoes in the footwear category. In the example shown in FIG. 7, the items 204 are arrayed along the axis 702*n* in the order in which they are ranked for the subjective attribute "style," from lowest to highest. In the example shown in FIG. 7, the customers have voted the item 204*b* (e.g., a shoe) as the least stylish, with the items 204*a*, 204*n*, and 204*c* being more stylish, in the order shown.

The arrangements shown in FIG. 7 may serve as a basis for compiling and encoding a rankings page that presents items that are within a given category or that pertain to a given subjective attribute. This page may display the ranked items without regard to any particular item of interest, while the pages shown in, for example, FIGS. 5 and 10 may show items ranked relatively to a particular item of interest.

Figure 8:
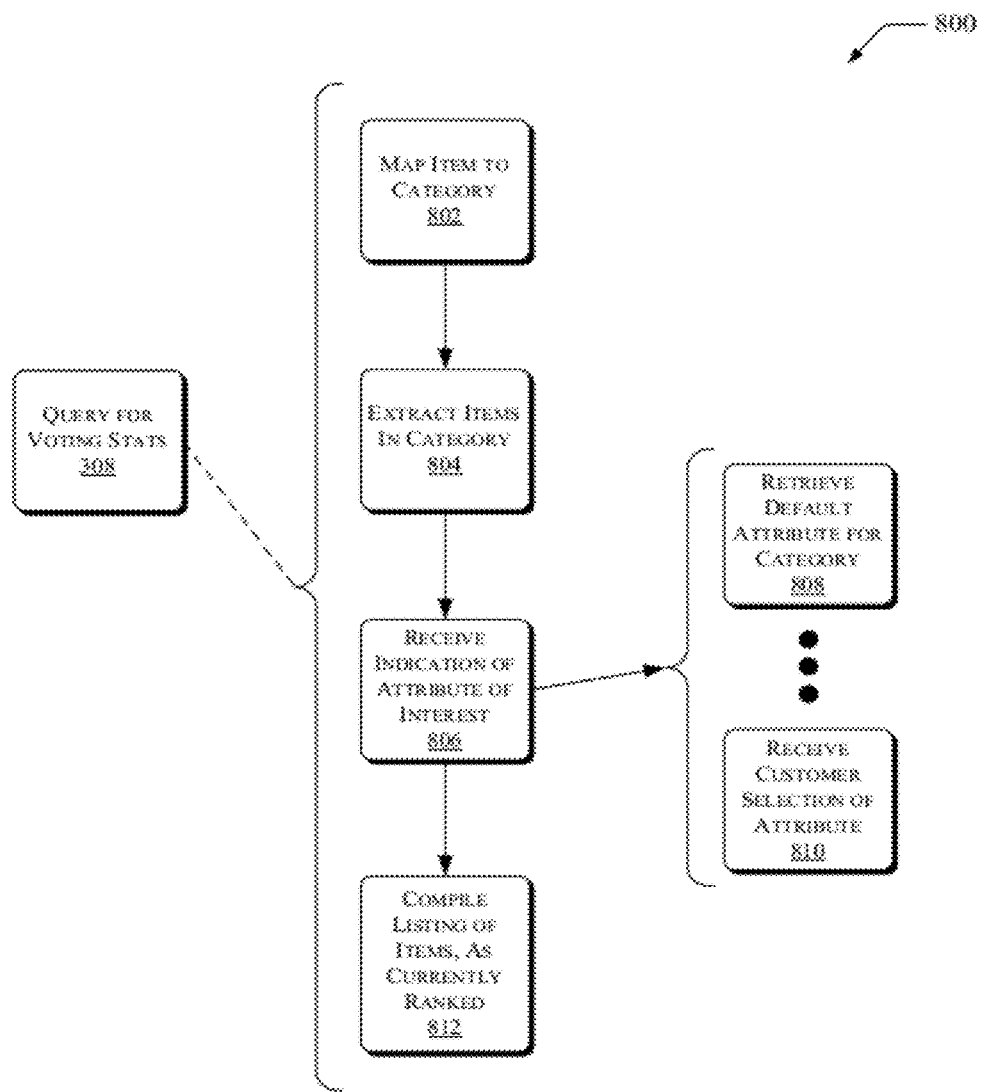
FIG. 8 is a flow diagram illustrating process flows for querying the voting data store for any voting data pertaining to a given item of interest, and for compiling a listing of a plurality of items as currently ranked based on the voting data.

Having described rankings of the items within a category, according to one or more subjective attributes in FIG. 7, the discussion now turns to a description of process flows for querying the voting data store and determining voting statements related to particular items, now presented with FIG. 8.

FIG. 8 illustrates process flows, denoted generally at 800, for querying the voting data store for any voting data pertaining to a given item of interest, and for compiling a listing of a plurality of items as currently ranked based on the voting data. For convenience but not limitation, some elements described previously are carried forward into FIG. 8 and denoted by the same reference numerals.

The process flows 800 provide more detail on the processing shown in block 308 in FIG. 3, which block represents querying for voting statistics for a particular item of interest to the customer. Turning now to the process flows 800 in more detail, block 802 represents mapping an indication of the item of interest to a corresponding category in which that item is organized. FIG. 6 shows examples of categories in the voting data store at 602, and block 802 may include searching the item records 604 for any that match an input item of interest.

Block 804 represents extracting from the voting data store items data store that are in the same category as the item of interest. For example, assuming that the item of interest is a particular shoe, block 802 may include determining that the item of interest is in a footwear category. In turn, block 804 may include pulling all shoes that are in the footwear category, for possible comparison against the shoe of interest. Turning briefly to the example voting data store in FIG. 6, block 804 may include traversing and extracting data from all item records 604 under a given category record.

Block 806 represents receiving an indication of a subjective attribute that is related to the item of interest. As shown in FIG. 8, block 806 may include retrieving one or more default subjective attributes for the category in which the item of interest lies, as represented at block 808. For example, if the item of interest is a shoe, then block 806 may include determining that style and comfort are attributes of interest related to shoes.

In some implementations, if a given item is associated with more than one subjective attribute of possible interest, then the process flows 800 may present the attributes to customers. In these implementations, the process flows 800 may compile the item page based on this subjective attribute.

In other implementations, a particular item may be associated with more than one subjective attribute. In these cases, the process flows 800 may randomly select one of the subjective attributes for presentation, or may select a subjective attribute for a particular item using any number of suitable strategies. For example, one subjective attribute may be deemed most important or relevant for the particular item. In another example, the process flows may select the subjective attribute for which the most voting data exists. In these implementations, the process flows 800 may compile the item page based on this subjective attribute (however selected), but may also display one or more other subjective attributes that may be relevant to the particular item. These process flows 800 may also enable the customer to select from these other subjective attributes for compiling the item page.

In still other implementations, the process flows 800 may combine or aggregate two or more of these subjective attributes when compiling the item page, such that the item page reflects the cumulative effect of the combined attributes.

Block 806 may also include receiving an indication of a customer selection of one or more subjective attributes of interest to the customer, as represented at 810. For example, a customer researching available shoes may be interested only in style and not comfort, and may so specify.

Block 812 represents compiling a listing of the items extracted in block 804, arranged according to the one or more attributes specified in block 806. FIG. 7 shows examples of such listings, with the attributes of interest being represented by the axes 802. Block 812 may include determining where the items extracted in block 804 are arranged along the axes, depending on how customers have ranked these items for the subjective attribute of interest.

The process flows 800 may result in the information used to present the ranking section 502 shown in FIG. 5. More specifically, the ranked items 508 may be presented in the order depicted in FIG. 7, according to the attribute(s) of interest at a particular time.

Figure 9:
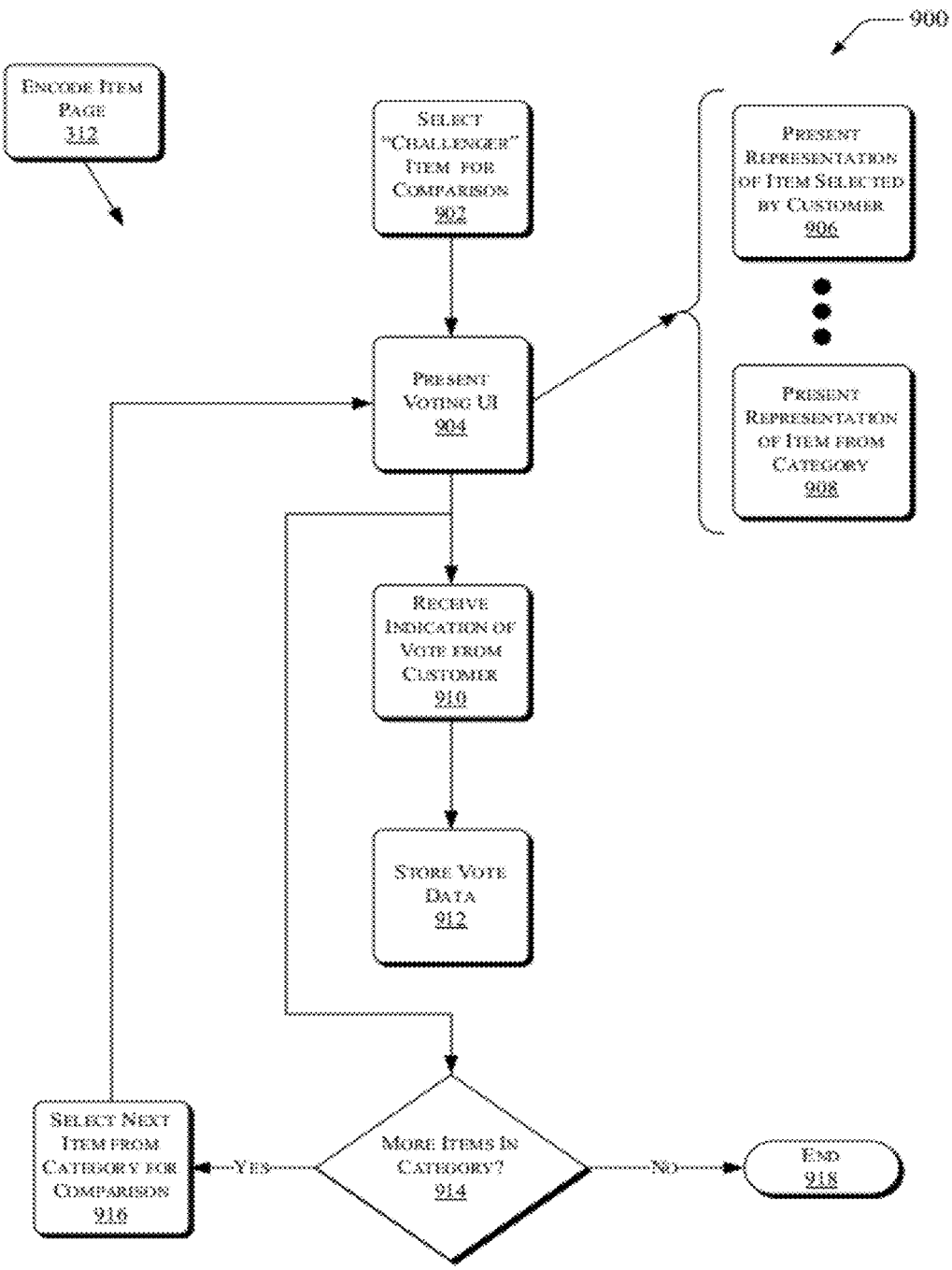
FIG. 9 is a flow diagram illustrating process flows for encoding an item page that is compiled based on the voting data.

Having described the process flows for querying the voting data store and determining voting statements related to particular items in FIG. 8, the discussion now turns to a description of process flows for encoding an item page, now presented with respect to FIG. 9.

FIG. 9 illustrates process flows, denoted generally at 900, for encoding an item page that is compiled based on the voting data. For convenience but not limitation, some elements described previously are carried forward into FIG. 9 and denoted by the same reference numerals.

The process flows 900 elaborate further on block 312 in FIG. 3, which represents encoding the item page for transmission to a customer's client browser. More specifically, the process flows 900 enable the customers to express their opinions on how a particular item of interest compares or relates to other items in a similar category, considering one or more subjective attributes of interest. Turning briefly to FIG. 5, the process flows 900 may be performed to populate, for example, the voting section 512.

As shown in FIG. 9, block 902 represents selecting one or more "challenger" items for comparison to the item of interest. Block 902 may include selecting one or more items from a cache containing potential challenger items. This cache may be populated according one or more of the criteria shown in FIG. 4. Block 902 may include selecting challenger items based on categories, sub-categories, or other hierarchies in which the items of interest and potential challenger items are organized. For example, assuming that the item of interest is the movie "Caddyshack", an example category may be comedy DVDs. In this example, block 902 may include selecting another comedy DVD for the customer to compare to "Caddyshack" for funniness. If one or more comedy DVDs have been viewed recently by other customers, the cache may contain entries for these comedy DVDs, and block 902 may include selecting one or more of these entries from the cache.

Block 904 represents presenting a user interface (UI) that enables the customer to compare the item of interest to a challenger item, and vote as to which of the items better exemplifies or better exhibits some subjective attribute. FIG. 5 shows an example of a voting UI at 512, which includes a button 514 for the item of interest and a button 516 for the other item in the category.

As shown in FIG. 9, block 904 may include presenting a graphical representation of the item of interest, as represented by block 906. Block 906 may result in the presentation of the button 514, for example.

As also shown in FIG. 9, block 904 may include presenting a graphical representation of the selected challenger item, as represented by block 908. Block 908 may result in the presentation of the button 516, for example.

Block 910 represents receiving an indication of a vote cast by the customer. For example block 910 may include receiving one or more software signals that result from the customer selecting one of the buttons 514 or 516 to vote for one of the items represented by these buttons.

Block 912 represents storing vote data in response to the vote cast by the customer. Block 912 may include storing the vote data in a temporary cache, or in a voting data store, such as the voting data store 208 shown in FIG. 2. The vote data stored in block 912 may serve as raw vote data that is aggregated to determine rankings of the various items. This aggregation may occur at any convenient time. Returning to the "Caddyshack" example above, if the customer's vote indicates that he or she considers "Caddyshack" to be a funnier movie than the other movie, then the voting data store is updated accordingly.

At a convenient point in the process flow 900, program control may pass to block 914, which represents evaluating whether more items remain for comparison to the item of interest. In the example shown in FIG. 9, blocks 910 and 912 may be performed for a given item of interest and a given challenger item, while block 914 is performed in parallel with blocks 910 and 912. In some instances, the process flows 900 may be invoked to select a predefined number of challenger items and compare them to the item of interest. If more challenger items remain for comparison, the process flows 900 may take the Yes branch to block 916, which represents selecting a next item for comparison to the item of interest. Recall that the challenger items may be selected for the item of interest at block 310 in FIG. 3.

Returning to the "Caddyshack" example above, block 916 may include selecting another comedy DVD for comparison to "Caddyshack." Afterwards, the process flows 900 may return to block 904, to present a new voting UI to the customer featuring the item of interest and a new challenger item. As shown in FIG. 9, block 914 need not await the completion of blocks 910 and 912. However, implementations are also possible in which block 914 is performed after block 912. This new voting UI may include buttons for "Caddyshack" and the newly-selected comedy DVD. The process flows 900 may then repeat blocks 910-916 with the newly-selected comedy DVD.

From block 914, when no items remain for comparison to the item of interest, the process flows 900 may take the No branch to an end or exit state 918. The process flows 900 may remain in the state 918 until re-invoked for another item of interest.

Figure 10:
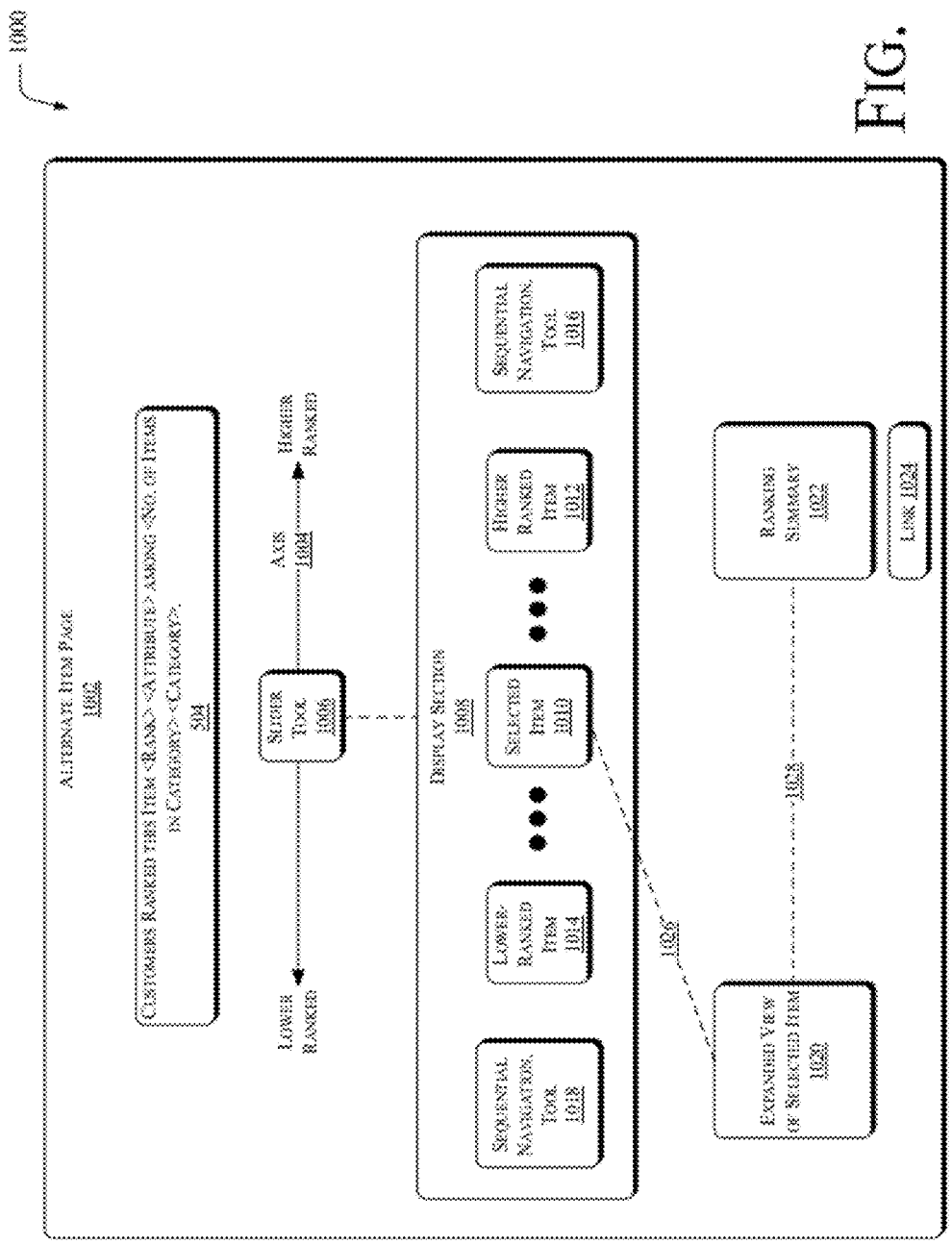
FIG. 10 is a block diagram illustrating item pages, presenting a user interface by which the customer may browse through a plurality of items arranged along an axis according to their rankings for at least one subjective attribute.

Having described the process flows 900 for encoding item pages in FIG. 9, the discussion now turns to a description of item pages that enable the customers to browse or navigate through selections of items arrayed along an axis depending on how these items are ranked for a selective attribute, now presented with respect to FIG. 10.

FIG. 10 illustrates alternative forms of item pages, denoted generally at 1000, for presenting a user interface by which the customer may browse through a plurality of items arranged along an axis according to their rankings for at least one subjective attribute. For convenience but not limitation, some elements described previously are carried forward into FIG. 10 and denoted by the same reference numerals.

Examples of alternate item pages are denoted generally at 1002. The alternate item pages 1002 may include some aspects carried forward from the item page 216 shown in FIG. 5. For example, the alternate item pages may include areas for showing in summary where a given item of interest is ranked relative to other comparable items. These areas are carried forward at 504.

The alternate item pages may include an axis 1004 along which a current item of interest (e.g., 204) may be displayed, along with a plurality of other items to which the item of interest has been compared by customers. These items may be arranged along the axis to reflect customer opinion on how these items rank according to one or more subjective attributes. The axis may be segmented, as represented by the vertical lines intersecting the axis 1004, depending on how much space is available, so as to suggest how many other items are also displayed along the axis.

As shown in FIG. 10, the alternate item pages may include at least one slider tool that is responsive to customer input to change the context of items displayed in the detail page 1002. FIG. 10 shows an example in block form that includes a slider tool 1006.

The alternate item pages may include a display section 1008 that may contain representations of various items logically arrayed along the axis 1004, depending one how those items are ranked for a subjective attribute. In different implementations, these representations may include graphics or photos, icons, or textual matter. For example, the display section 1008 may contain a representation of the item of interest 204, denoted at 1010. The display section 1008 may also contain representations of zero or more items that are ranked higher than the item of interest. FIG. 10 denotes these zero or more higher-ranked items at 1012. The display section 1008 may also contain representations of zero or more items that are ranked lower than the item of interest. FIG. 10 denotes these zero or more lower-ranked items at 1014.

The alternate detail page may be responsive to customer input on the slider tool 1006 to adjust which items are presented in the display section 1008. Initially, the representation of the item of interest 1010 may be centered in the display section 1008, between the representations of the next higher and lower ranked items 1014 and 1016. Thus, the display section 1010 provides a type of sliding window in which some subset of the items is visible. However, the display section 1008 may be operatively linked to the slider tool 1006, as represented by the dashed line connecting these elements in FIG. 10. If, for example, the customer moves the slider tool 1006 to the right, toward the label "higher ranked", the elements displayed in the display section 1008 may shift to the left. If the customer moves the slider far enough to the right, the lower-ranked item 1014 may eventually shifting out of the window to the left, with a new higher-ranked item shifting into the window from the right.

Conversely, if the customer moves the slider tool 1006 to the left, toward the label "lower ranked", the elements displayed in the display section 1010 may shift to the right. If the customer moves the slider far enough to the left, the higher-ranked item 1012 may shift out of the window altogether, and with a new lower-ranked item shifting into the window from the left.

In this manner, the customer may change the context of the items presented in the display section 1008 by interacting with the slider tool 1006, and navigate to items that are ranked higher or lower than the item of interest for a subjective attribute of interest. Eventually, if the customer moves the slider 1006 sufficiently far along the axis 1004, the representation 1010 of the item of interest may itself disappear from the display section 1008.

Returning to the "Caddyshack" example from above, assume that the item of interest 1010 is a DVD of this movie, and that the attribute if interest is perceived funniness of movies. The higher ranked item 1012 may be the next funnier movie as compared to "Caddyshack," while the lower ranked item 1014 may be the next less funny movie as compared to "Caddyshack." By moving the slider tool 1006 to the right along the axis 1004, the customer may navigate to and discover increasingly funny movies, and by moving the slider tool 1006 to the left along the axis 1004, the customer may navigate to and discover decreasingly funny movies.

The item page 1002 may also include sequential navigation tools 1016 and 1018, which are responsive to customer input to slide the items presented in the display section 1008 to the left or to the right, depending on which tool the customer selects. For example, the navigation tool 1016 may be responsive to customer input (e.g., mouse clicks) to shift one lower-ranked item out of the display to the left, in favor of shifting in one higher-ranked item into the display from the right. The navigation tool 1018 may operate in reverse. In general, the item page may shift the displayed items X times, where X is an integer representing the number of discrete inputs provided by the customer on the tools 1016 or 1018.

As compared to the sequential navigation tools 1016 and 1018, the slider tool 1006 provides a more continuous operation. The slider tool 1006 enables the customer to navigate to an arbitrary spot along the axis 1004, thereby changing the context of items presented in the display section. The navigation tools 1016 and 1018 enable the customer to sequentially display either higher-ranked or lower-ranked items.

The item page 1002 may include an area 1020 that provides more detail or an expanded view of any item having representations presented in the display section 1008. The display section may be responsive to customer input on any of these representations to provide this additional detail. For example, the customer may hover a pointing device over the representation, or may click on the representation, to trigger the display of more detail related to the underlying item.

The item page 1002 may also include an area 1022 that provides a ranking summary of the item selected by the customer. For example, this area 1022 may include representations of the selected item and at least one other "challenger" item to which customers have compared the selected item for a given subjective attribute (e.g., stylishness). The area 1022 may indicate how many votes have been cast for each item, and may indicate the percentages of votes cast for each item by the customers. The item page 1002 may also include a link or other navigation tool 1024 by which the customers may explore other items to which customers have compared the selected item.

In the example shown in FIG. 10, the customer has selected the item of interest 1010 to obtain further detail on it. In response to this selection, the item page 1002 may populate the expanded display area 1020 with a larger picture of the item, as represented by the dashed line 1026. In addition, the item page may populate the ranking summary area 1022 with any ranking information related to the item, as represented by the dashed line 1028.

Figure 11:
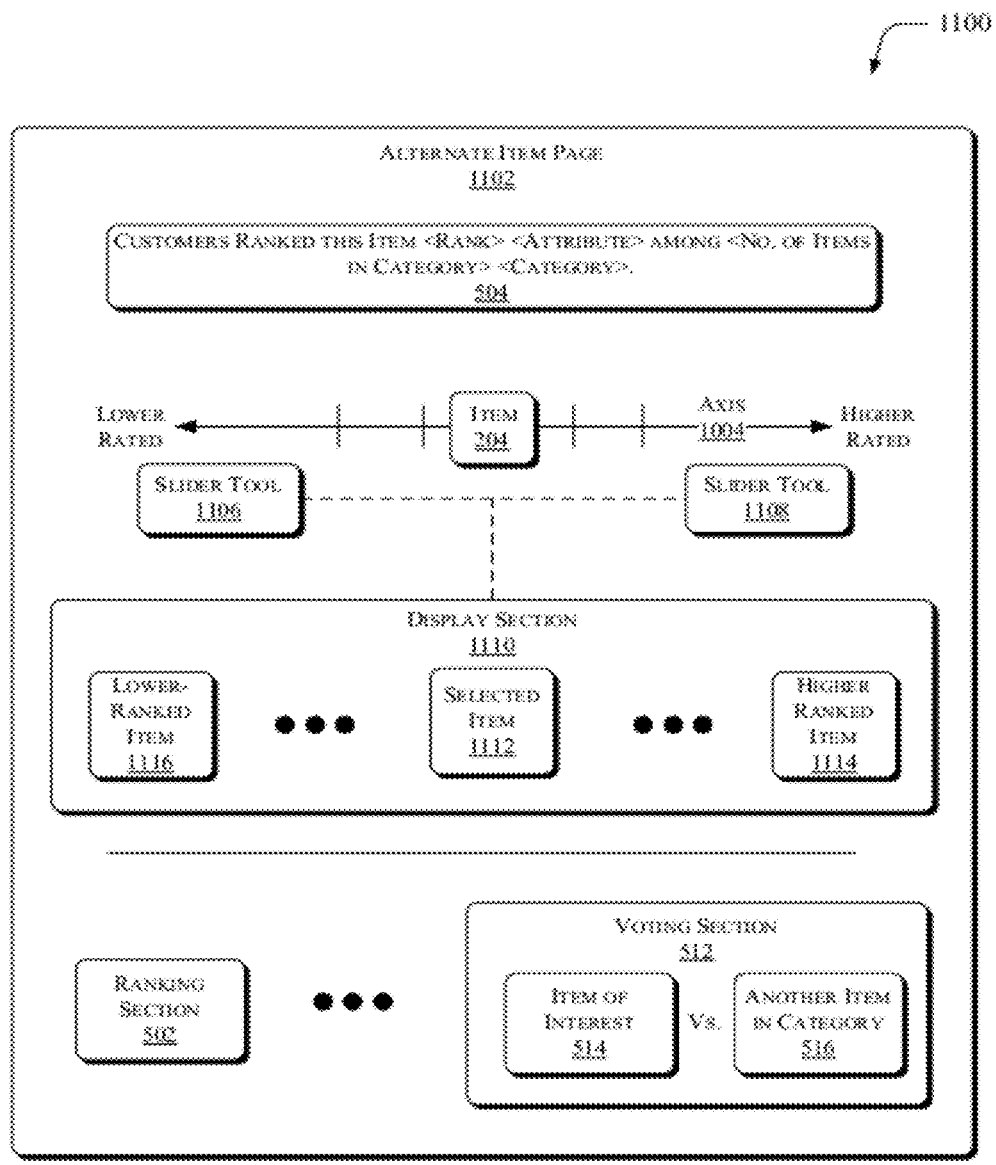
FIG. 11 is a block diagram illustrating alternative forms of the item pages shown in FIG. 10, presenting another user interface by which the customer may browse through a plurality of items arranged along an axis according to their rankings for at least one subjective attribute.

FIG. 11 illustrates alternative forms of item pages, denoted generally at 1100, for presenting a user interface by which the customer may browse through a plurality of items arranged along an axis according to their rankings for at least one subjective attribute. For convenience but not limitation, some elements described previously are carried forward into FIG.

11 and denoted by the same reference numerals. The item pages shown in FIG. 11 illustrate various alternatives to the item pages shown in FIG. 10.

Examples of alternate item pages are denoted generally at 1102. The alternate item pages 1102 may include the summary areas 504, and may include an axis (e.g., 1004) along which a representation of an item of interest (e.g., 204) may be displayed, along with a plurality of other items to which the item of interest has been compared by customers. These items may be arranged along the axis to reflect customer opinion on how these items rank according to one or more subjective attributes. The axis may be segmented, as represented by the vertical lines intersecting the axis 1004, depending on how much space is available, so as to suggest how many other items are also displayed along the axis.

As shown in FIG. 11, the alternate item pages may include at least one slider tool that is responsive to customer input to change the context of items displayed in the axis 1004. FIG. 11 shows an example in block form that includes two slider tools 1106 and 1108. However, other implementations may include a single slider tool that may be moved along the axis to change the context of the items shown. For example, assuming that the items are arranged in ascending order according to how the items are ranked for a subjective attribute, clicks on the slider tool 1106 may cause the item 204 to be pushed to the right, while clicks on the slider tool 1108 may cause the item 204 to be pushed to the left.

The alternate item pages may include a display section 1110 that may contain representations of the items arrayed along the axis 1004. In different implementations, these representations may include graphics or photos, icons, or textual matter. For example, the display section 1110 may contain a representation of the item of interest 204, denoted at 1112. The display section 1110 may also contain representations of zero or more items that are rated higher than the item of interest. FIG. 11 denotes these zero or more higher-ranked items at 1114. The display section 1110 may contain representations of zero or more items that are rated lower than the item of interest.

FIG. 11 denotes these zero or more lower-ranked items at 1116. The alternate detail page may be responsive to customer input on one of the representations (e.g., 1112, 1114, or 1116) to display more detail on the item corresponding to the representation. For example, the customer may hover a pointing device over the representation, or may click on the representation, to trigger this display of more detail related to the underlying item.

Initially, the representation 1112 may be centered in the display section 1110, between the representations of the next higher and lower ranked items 1114 and 1116. Thus, the display section 1110 provides a type of sliding window in which some subset of the items is visible. However, the display section 1108 may be operatively linked to the slider tools 1106 and 1108, as represented by the dashed line connecting these elements in FIG. 11. As the customer clicks on the slider tool 1108, for example, the elements displayed in the display section 1110 may shift to the left, with the lower-ranked item 1116 shifting out of the window altogether, and with a new higher-ranked item shifting in to the window. Conversely, as the customer clicks on the slider tool 1106, the elements displayed in the display section 1110 may shift to the right, with the higher-ranked item 1114 shifting out of the window altogether, and with a new lower-ranked item shifting in to the window. In instances where the alternate item page includes a single slider, the customer may achieve the same function by moving the single slider along the axis.

In this manner, the customer may change the context of the items presented in the display section 1110, and navigate to items that are ranked higher or lower than the item of interest for a subjective attribute of interest. Eventually, if the customer clicks enough times on either of the slider tools 1106 or 1108, the representation of the item of interest may itself disappear from the display section 1110.

In example implementations shown in FIG. 11, the alternate item pages may include the ranking section 502, as described above with FIG. 5. Additionally, the alternate item pages may include the voting section 512 and related buttons 514 and 516, as also described above with FIG. 5.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user interface generated by an application executing on a server by one or more processors for presenting an item page to a customer, the item page comprising:
    a representation of an axis corresponding to a subjective attribute;
    a display section that displays a representation of a first item of interest to the customer and displays a representation of a second item to the customer, the first item of interest being displayed at least in response to determining that a number of times that the first item of interest has been previously compared to at least one additional item by a plurality of unique customers is less than a minimal number threshold, wherein the first and second items are arranged along the axis based on rankings of the first and second items relative to the subjective attribute; and
    at least one slider tool responsive to input from the customer to present at least one additional item in the display section.

2. The user interface of claim 1, wherein the at least one additional item is ranked higher than the first item of interest for the subjective attribute.

3. The user interface of claim 1, wherein the at least one additional item is ranked lower than the first item of interest for the subjective attribute.

4. The user interface of claim 1, wherein the slider tool is displayed on the axis, and wherein the slider tool is responsive to customer input to slide along the axis to display at least one additional item that is higher ranked or lower ranked than the first item of interest for the subjective attribute.

5. The user interface of claim 1, further comprising first and second sequential navigation buttons, wherein the first sequential navigation button is responsive to being selected to present at least one additional item in the display section that is higher ranked for the subjective attribute than the first item of interest, and wherein the second sequential navigation button is responsive to being selected to present at least one additional item in the display section that is lower ranked for the subjective attribute than the first item of interest.

6. The user interface of claim 1, wherein the display section is responsive to customer input on a representation of a selected item presented in the display section to provide additional information regarding the selected item.

7. The user interface of claim 6, wherein the customer input includes hovering an input device pointer over the representation of the selected item, or clicking on the representation of the selected item.

8. The user interface of claim 6, further comprising an expanded view area for displaying a larger representation of the selected item, as compared to the representation of the selected item presented in the view area.

9. The user interface of claim 6, further comprising a ranking summary area for displaying information indicating how the selected item has been ranked for the subjective attribute relative to at least one other item.

10. The user interface of claim 6, further comprising a ranking summary area for displaying information indicating how many votes have been cast for the selected item, relative to at least one other item, considering the subjective attribute.

11. A user interface generated by an application executing on a server by one or more processors for presenting an item page to a customer, the item page comprising:
- a representation of an axis corresponding to a subjective attribute;
- a display section that includes representations of a first item of interest to the customer and a second item, wherein the first and second items are arranged along the axis based on rankings of the first and second items relative to the subjective attribute; and
- a voting section that includes a first voting button corresponding to the first item and a second voting button corresponding to the second item, wherein the first voting button is selectable by the customer to indicate a preference of the first item over the second item by a customer, and the second voting button is selectable by the customer to indicate a preference of the second item over the first item by the customer,
- wherein a selection of the first voting button indicating a preference for the first item over the second item causes the voting section to replace the second item with at least a third item, and to update the second button to correspond to the third item.

12. The user interface of claim 11, further comprising a first sequential navigation button and a second sequential navigation button, the first sequential navigation button, when selected, causes presentation of at least one additional item in the display section that is higher ranked for the subjective attribute than the first item of interest, and the second sequential navigation button, when selected, causes presentation of at least one additional item in the display section that is lower ranked for the subjective attribute than the first item of interest.

13. The user interface of claim 11, wherein a selection of the second voting button indicating a preference for the second item over the first item causes the voting section to replace the first item with at least the third item, and to update the first button to correspond to the third item.

14. The user interface of claim 11, wherein the voting section further includes at least a third button to enable the customer to decline to indicate any preference, and wherein the voting section is responsive to the third button being selected to replace the second item with at least a third item, and to update the second button to correspond to the third item.

15. A system comprising:
one or more processors; and
memory to store executable instructions that, when executed by the one or more processors, is configured to generate a user interface comprising:
- a representation of an axis corresponding to a subjective attribute;
- a display section that includes representations of a first item of interest to a customer and a second item, wherein the first and second items are arranged along the axis based on rankings of the first and second items relative to the subjective attribute; and
- a voting section that includes a first voting button corresponding to the first item, a second voting button corresponding to the second item, wherein the first voting button is selectable by the customer to indicate a preference of the first item over the second item by a customer, the second voting button is selectable by the customer to indicate a preference of the second item over the first item by the customer,
- wherein a selection of the second voting button indicating a preference for the second item over the first item causes the voting section to replace the first item with at least a third item, and to update the first button to correspond to the third item.

16. The system of claim 15, further comprising a first sequential navigation button and a second sequential navigation button, the first sequential navigation button is responsive to being selected to present at least one additional item in the display section that is higher ranked for the subjective attribute than the first item of interest, and the second sequential navigation button is responsive to being selected to present at least one additional item in the display section that is lower ranked for the subjective attribute than the first item of interest.

17. The system of claim 15, wherein a selection of the first voting button indicating a preference for the first item over the second item causes the voting section to replace the second item with at least the third item, and to update the second button to correspond to the third item.

18. The system of claim 15, wherein the voting section is responsive to a third button being selected to replace the second item with at least the third item, and to update the second button to correspond to the third item.

19. The system of claim 15, wherein the voting section further includes at least a third button to enable the customer to decline to indicate any preference, and wherein the voting section is responsive to the third button being selected to replace the second item with at least the third item, and to update the second button to correspond to the third item.

* * * * *